US005792424A

United States Patent [19]

Homberg et al.

[11] Patent Number: 5,792,424

[45] Date of Patent: Aug. 11, 1998

[54] MANUAL PIPETTE WITH DELAYED-ACTION HOME POSITION LATCH

[75] Inventors: William D. Homberg, Oakland; Christopher Kelly, Larkspur; Kenneth Rainin, Piedmont; Haakon T. Magnussen, Jr., Orinda, all of Calif.

[73] Assignee: Rainin Instrument Co., Inc., Emeryville, Calif.

[21] Appl. No.: 658,862

[22] Filed: Aug. 15, 1996

Related U.S. Application Data

[63] Continuation-in-part of Ser. No. 611,075, Mar. 5, 1996, abandoned.

[51] Int. Cl.[6] .................................. B01L 3/02; G01N 1/14

[52] U.S. Cl. ......................... 422/100; 422/103; 73/864.16; 73/864.18; 436/180

[58] Field of Search ..................................... 422/100, 101, 422/102, 103, 104; 73/864.16, 864.18; 436/180; 222/287, 309, 321

[56] References Cited

U.S. PATENT DOCUMENTS

| | | | |
|---|---|---|---|
| 3,827,305 | 8/1974 | Gilson et al. | 73/864.18 |
| 4,041,764 | 8/1977 | Sabloewski et al. | 73/864.14 |
| 4,327,595 | 5/1982 | Schultz | 73/864.12 |
| 4,406,170 | 9/1983 | Kuhn | 73/864.16 |
| 4,763,535 | 8/1988 | Rainin et al. | 73/864.18 |
| 4,909,991 | 3/1990 | Oshikubo | 422/100 |
| 5,364,596 | 11/1994 | Magnussen, Jr. et al. | 422/100 |

*Primary Examiner*—Harold Y. Pyon
*Attorney, Agent, or Firm*—Robert R. Meads

[57] ABSTRACT

A manual pipette including a delayed action home position latch for engaging only after the plunger unit of the pipette has moved downward through its home position to thereafter releasably connect a moveable bottom stop member to the plunger unit to move therewith and upon an upward return of the plunger unit by the pipette's return spring to engage a home position stop to releasably lock the plunger unit in its home position without any downward force being exerted by the pipette user on the plunger unit.

18 Claims, 10 Drawing Sheets

MANUAL PIPETTE WITH DELAYED-ACTION HOME POSITION LATCH

RELATED APPLICATION

This patent application is a continuation in part of patent application Ser. No. 08/611,075 filed Mar. 5, 1996, now abandoned.

BACKGROUND

The present invention relates to manual pipettes and, more particularly, to an improved manual pipette including a delayed-action home position latch which accommodates smooth uninterrupted user controlled movement of the pipette plunger unit from its upper stop position, through the pipette's home position and into and through blow out to a bottom stop position during dispensing of liquid by the pipette and which accommodates automatic actuation during or following blow out to thereafter releasably maintain the plunger unit at the home position ready to aspirate a predetermined volume of liquid.

U.S. Pat. Nos. 3,827,305 and 4,909,991, for example, describe commercially available single channel manual pipettes. Each such pipette includes an elongated hand-holdable pipette body housing an upwardly spring biased plunger unit. The plunger unit is supported for axial movement in the pipette body between a first or upper stop position in which an end portion of the plunger unit extends from an upper end of the pipette body. A pipette user grips the pipette body with his or her thumb over the exposed end of the plunger unit. Downward thumb action on the plunger unit moves the plunger unit downward from its upper stop position against the upward bias of a return spring to a second or a lower stop position at which all fluid is expelled from a tip secured to the pipette. Adjacent the lower stop position is a "home" position for the plunger unit to which the plunger unit is returned by the pipette user at the beginning of each aspiration operation with the pipette.

In the commercially available pipettes described in the foregoing patents, the home position is defined by a "soft" stop. As described in such patents, the soft stop comprises a second relatively stiff spring mechanism within the pipette body which is activated when the plunger unit reaches the home position. In this regard, as the pipette user manually moves the plunger unit from its upper stop position by pressing downwardly with his or her thumb on the exposed end of the plunger unit, the pipette user can "feel" an increased resistance to movement of the plunger unit associated with an activation of the second spring assembly opposing further downward movement of the plunger unit. The position of the plunger unit where the user feels the activation of the second spring mechanism defines the home position for the plunger unit. Continued movement of the plunger unit beyond the home position to the lower stop position is resisted by a combination of the return spring and the second spring mechanism.

Thus, in pipetting liquids with such commercially available pipettes, the pipette user grasps the pipette housing with his or her thumb on top of the exposed end of the plunger unit. Exerting downward thumb pressure on the plunger unit, the user moves the plunger unit away from the upper stop position against the force of the return spring. The user detects the home position for the plunger unit during movement of the plunger unit away from the first stop position by sensing the start of an increase in the downward force required to move the plunger unit. Such increase in force is the result of movement of the plunger unit against the return spring and the second spring mechanism, commonly referred to as a "blowout" spring mechanism. Accurate sensing of the start of the increase in the downward force required to move the plunger unit is a delicate operation requiring great care to be exercised by the pipette user. Thus, with his or her thumb on top of the exposed end of the plunger unit, the user very carefully senses and then manually maintains the plunger unit at the home position. In practice, a significant portion of the total time associated with a pipetting operation is occupied by the pipette user manually maintaining the plunger unit at the home position ready for insertion of a tip extending from the pipette into the liquid which is to be aspirated by the pipette. Then, with the tip inserted in the liquid, the user manually controls the rate of return of the plunger unit from the home position to the upper stop position.

For accuracy and repeatability of operation of the pipette, it is important that the pipette user always bring the plunger unit to the exact same home position and that the pipette user manually control the rate of return of the plunger unit to the upper stop position in a repeatable manner for each pipette operation. This is necessary in order that the same desired volume of liquid will be drawn into the pipette tip during each repeated operation. It should be appreciated that such manual operation of a pipette places substantial physical and mental strain upon the pipette user over the course of a series of pipette operations wherein repeatability of operation is essential. In extreme cases, the physical hand and wrist strain associated with extensive and prolonged manual pipette operation can contribute to or produce carpel tunnel syndrome.

Similar physical and mental stress problems are associated with other manual pipettes which include different mechanisms for defining the plunger unit home position. Examples of such different mechanisms are described in U.S. Pat. No. 4,041,764 and in German patent applications 239 539 A1 and 239 540 A1. Specifically, U.S. Pat. No. 4,041,764, describes a magnetic detent which is engaged between an upper stop and a home position for a pipette piston and is disengaged by the pipette user exerting an increased axial force on a push button when it is desired to move the piston beyond the home position against the force of a return spring.

The German patent applications, on the other hand, each describe a hollow piston pipette with ferromagnetic systems at upper and lower stops. The lower stop is a "hard" bottom stop for the hollow piston in that no piston movement beyond the lower stop is permitted. A user of the hollow piston pipette does not have to "feel" a "soft" stop defining a home position for the hollow piston. Rather, the lower stop defines the home position for the hollow piston pipette. Thus, in the operation of the hollow piston pipette, the user simply grasps the pipette body and by exerting a downward thumb force on an activating knob drives the hollow piston to the lower stop. To aspirate liquid into a tip connected to a lower cone of the hollow piston pipette, the user simply releases the activating knob and allows a compression spring to move the hollow piston from the lower stop to the upper stop. The ferromagnetic systems of the upper and lower stops interact with a magnetized locking piece to control operation of a disk seal in opening and closing the aperture of the hollow piston. For example, since the retaining force of the ferromagnetic system of the lower stop is greater than that of the locking piece and the axial motion of the locking piece is limited by a stop, the disk seal lifts away from a flange on the hollow piston and frees the aperture of the hollow piston so that a first cylinder-piston system communicates with a lumen of the pipette tip through the hollow piston and holes leading to a ventilation channel to atmosphere.

It is to be noted that in all of the foregoing manual pipettes, the pipette user is required to continuously apply steady downward force with his or her thumb to maintain the pipette plunger unit in its home position ready for insertion of a tip of the pipette into the liquid to be drawn into the tip by controlled upward movement of the plunger unit from the home position to its upper stop position.

Recognizing the physical and mental strain associated with repeated and prolonged operation of a manual pipette by a pipette user, mechanisms have been developed for addition to manual pipettes which will automatically control the rate of return of a plunger unit from its home position to its upper stop position. Examples of such mechanisms are illustrated and described in U.S. Pat. No. 4,763,535 assigned to the assignee of the present invention, and in German Offenlegungsschrift DE 39 03 241 A1. U.S. Pat. No. 4,763,535 describes a dashpot mechanism for automatically controlling the rate of return of a plunger from its home to upper stop positions. The German patent application describes an attenuating mechanism for automatically slowing the rate of upward piston movement as it leaves its home position to return to its upper stop position. A preferred form of the attenuation mechanism comprises a damping or braking device which dampens a first segment of the piston return movement directly after the start of the aspiration of liquid by the associated pipette. One embodiment of the braking device described in the German patent application comprises a magnet secured in the pipette housing to contact a counter element secured to a pipette piston when the piston is fully depressed to its home position. By such construction, a braking or attenuating force is generated which opposes the return spring during the first segment of piston return motion. As described in the German patent application, such an attenuating force is intended to control the rate of piston movement as it leaves the home position to prevent undesired surging of liquid into the pipette tip, such surging of liquid being commonly referred to as "fountaining".

More recently, to significantly reduce the physical and mental strain associated with the operation of manual pipettes and to eliminate the need for the pipette user to physically maintain a pipette plunger in a home position, a latch mechanism operable as a pipette plunger reaches the home position has been developed and is described and illustrated in U.S. Pat. No. 5,364,596 assigned to the assignee of the present invention. As described in U.S. Pat. No. 5,364,596, the latch mechanism releaseably maintains a plunger in the home position without any user exerted force on the plunger in opposition to the force of the return spring. Such an improved manual pipette may further include a velocity governor for automatically controlling the rate of return movement of the piston from the home position to the upper stop position for the plunger upon a release of the latch mechanism.

While the manual pipettes described in U.S. Pat. No. 5,364,596 including latch and velocity governor mechanisms provide significantly improved repeatability and reliability of operation and reduce the physical and mental strain on pipette users where repeatability of operation is essential, for those applications were total user control over the rate of movement of the plunger during pipette dispensing operations as required, the actuation of the latch as the plunger approaches and reaches the home position may interfere with such desired user control. For example, in the manual pipettes including a magnetic latch at the home position, as the plunger approaches the home position, a stronger and stronger downward force is exerted by the latch magnet on the moving plunger as it gets closer and closer to the home position. In those applications where the pipette user desires to maintain a slow smooth rate of movement of the plunger at the end of its dispensing stroke above the home position, the increase in magnetic attraction can produce an undesired sudden movement of the plunger as the magnetic latch engages. Accordingly, there is a need for an improved manual pipette with a home position latch which is characterized by engagement during dispensing operation of the pipette only after the plunger has passed through the home position and which following "blow out" releaseably locks the plunger at the home position. The present invention satisfies such needs.

SUMMARY OF INVENTION

Like prior conventional manual pipettes, the present invention comprises a hand holdable pipette body having a return spring biased plunger unit supported therein for axial movement from a first or upper stop position. As with prior manual pipettes, a pipette user holding the pipette of the present invention presses on a plunger control knob to move the plunger unit from the upper stop position against the return spring to a second or lower stop position wherein all fluid contained in a pipette tip is expelled from the tip. The pipette user then allows the return spring to return the plunger to a "home" position adjacent the lower stop position. The "home" position is the starting position to which the plunger unit is returned for the start of each successive aspiration operation with the pipette. In prior conventional manual pipettes, the pipette user must exert a relatively strong downward thumb force on the plunger unit to retain it in the "home" position in opposition the return spring and a relatively strong "blow out" spring defining a "soft" stop. In particular, any downward movement of the plunger unit beyond the "home" position activates the "blow out" spring which generates a strong upward force in opposition to such downward movement of the plunger unit. The pipette user senses or "feels" the start of the increase in the return force which provides the user an indication that the plunger unit has reached and is at the "home" position. With the present invention however, rather than requiring the user to carefully sense the exact start of a sudden increase in a force opposing downward movement of a plunger unit in locating the "home" position for the plunger unit and rather than requiring the user to manually exert a strong downward force to maintain the plunger unit in its "home" position against the return spring, the pipette of the present invention eliminates the need for a strong blow out spring and includes a delayed action home position latch which allows the pipette user to maintain full control over the downward movement of the plunger unit against the return spring as the plunger unit approaches and passes through the home position during the dispensing operation of the pipette. The delayed action latch only engages during blow out or after blow out is completed. Thus, with the present invention, the pipette user is able to maintain total control over the rate of movement of the plunger unit during pipette dispensing operation without any interference by the home position latch. Further, the elimination of the strong blow out spring reduces the hand forces which the pipette user must generate in moving the plunger unit from the home position to the lower stop at the end of blow out thereby reducing pipette user fatigue.

Basically, the delayed action home position latch of the present invention comprises a stop member moveable axially within the housing of the pipette between the lower stop and a home position stop adjacent and slightly above the lower stop. The stop member carries a first latch member for engaging and locking with a second latch member carried by the piston unit only after the plunger unit has moved downward through its home position and a latch engaging force is exerted on the latch members. When the stop member is engaging or is resting on the lower stop, such a latch engaging force is exerted by a downward force on the plunger unit.

Preferably however, the home position latch further includes a resilient or deformable spacing member for separating the first and second latch members and for compressing, deforming or deflecting in response to the latch engaging force to permit the first and second latch members to engage and releaseably lock the stop member to the plunger unit.

Thus, in operation, as the plunger unit is moved by the downward thumb force of the pipette user from the upper stop position against the force of the return spring, the second latch member engages the spacing member and urges the spacing member downward to exert a downward force on the stop member. The stop member then moves with the plunger unit downward from a position against or below the home position stop to the lower stop. At the lower stop, further downward movement of the stop member is prevented and continued downward force on the plunger unit acts as the latching force to compress, deform or deflect the spacing member to allow the first and second latch members to engage to releaseably lock the stop member to the plunger unit. Thus locked, a release of the plunger unit by the pipette user allows the return spring to force the plunger unit and stop member upwardly within the pipette housing until the stop member engages the home position stop. This defines the home position for the plunger unit which is maintained without requiring the pipette user to exert any force on the plunger unit until such time as it is desired to aspirate liquid with the pipette. Then, when the pipette of the present invention is ready for aspiration of liquid, the pipette user simply actuates a release mechanism forcing the first and second latch members apart to allow the plunger unit to return to the upper stop position in response to the upward force of the return spring.

In a first embodiment of the present invention, the delayed action latch comprises a magnetic latch including a magnet secured to either the stop member or to the plunger unit and a pole piece secured to the other of the stop member or the plunger unit. The spacing member comprises a spacing spring between the pole piece and the magnet. As the plunger unit approaches the home position, the spacing spring transmits the downward force of the plunger unit to the stop member causing the stop member to move downward with the plunger unit to the lower stop against the force of the return spring. When the stop member engages the lower stop, further downward movement of the stop member is prevented. Continued downward movement of the plunger unit compresses the spacing spring to allow the magnet and pole piece to engage and actuate the home position latch. Then, with the latch engaged, a release of the plunger unit allows the plunger unit and stop member to move upward together in response to the force of the return spring until the stop member contacts the home position stop. This stops upward movement of the plunger unit and holds the plunger unit at its home position without the pipette user exerting any downward force on the plunger unit. Then, when it is desired to aspirate the measured quantity of the liquid sample, the pipette user places an end of the pipette tip in the sample and releases the magnetic latch by forcing the plunger unit upward away from the home position to separate the magnet and the pole piece. The plunger unit then continues its upward movement to the upper stop position under the influence of the return spring to aspirate the measured quantity of the sample into the tip of the pipette.

Alternatively, the delayed action home position latch may comprise a mechanical latch having a first locking member on the plunger unit and a second locking member on the stop member. The spacing member may comprise an axially extending and laterally flexible arm or fingers secured to one of the plunger unit or the stop member to engage one of the lock members to maintain a separation of the lock members as the stop member moves with the plunger unit to the lower stop. When the stop member contacts the lower stop, continued downward force of the plunger unit produces a lateral deflection of the axially extending fingers of the spacing member allowing the first and second lock member to engage and lock together, thereby engaging the home position latch. Then, with the latch engaged, a release of the plunger unit causes the plunger unit and stop member to move upward together in response to the force of the return spring until the stop member contacts the home position stop. This stops upward movement of the plunger unit and holds the plunger unit at its home position. This is accomplished without the pipette user exerting any downward force on the plunger unit. Then, when it is desired to aspirate the measured quantity of the liquid sample, the pipette user places an end of the pipette tip in the sample and releases the home position latch as by forcing the plunger unit upward away from the home position to separate the first and second lock members. The plunger unit then continues its upward movement to the upper stop position under the influence of the return spring to aspirate the measured quantity of sample into the tip of the pipette.

Accordingly, in addition to providing an improved manual pipette which simply and economically overcomes or substantially reduces the physical and mental strain normally associated with prolonged operation and use of manual pipettes, the present invention eliminates the need for a strong blow out spring and includes a delayed action home position latch which allows the pipette user to maintain full control over the downward movement of the plunger unit against the return spring as the plunger unit approaches and passes through the home position during the dispensing operation of the pipette. The delayed action latch only engages during blow out or after blow out is completed. Thus, with the present invention, the pipette user is able to maintain total control over the rate of movement of the plunger unit during pipette dispensing operation without any interference by the home position latch. Further, the elimination of the strong blow out spring reduces the hand forces which the pipette user must generate in moving the plunger unit from the home position to the lower stop at the end of blow out thereby significantly reducing pipette user fatigue normally associated with repeated operation of a manual pipette.

BRIEF DESCRIPTION OF DRAWINGS

FIG. 3 shows a first member of the delayed action home position latch as it approaches a second member of the latch with a spacing member of the latch engaging a bottom stop member of the pipette to urge the bottom stop member downward with the plunger unit, the first and second members of the latch being disengaged.

FIG. 4 shows the bottom stop member engaging the lower or bottom stop of the pipette, the spacing member comprising a spacing spring compressed and the first member of the delayed action home position latch engaged with the second member of the latch to releasably lock the stop member to the plunger unit.

FIG. 5 shows the stop member engaging a home position stop with the home position latch engaged to maintain the plunger unit at its home position ready to aspirate a measured quantity of a liquid sample into a tip (not shown) secured to a lower end of the pipette.

FIG. 6 shows the stop member released from the plunger unit and remaining against the home position stop while the plunger unit moves upward from the home position toward the upper stop in response to the force of the return spring. Upon reaching the upper stop, the plunger unit will appear as shown in FIG. 1 and the pipette will have completed its aspiration operation to draw the measured quantity of the liquid sample into the tip of the pipette. Thereafter, when it is desired to dispense the sample from the tip of the pipette, the user simply exerts a downward thumb force on a knob attached to a top of the plunger unit to move the plunger unit through the stages illustrated in FIGS. 1–4.

DETAILED DESCRIPTION OF INVENTION

Figure 1:
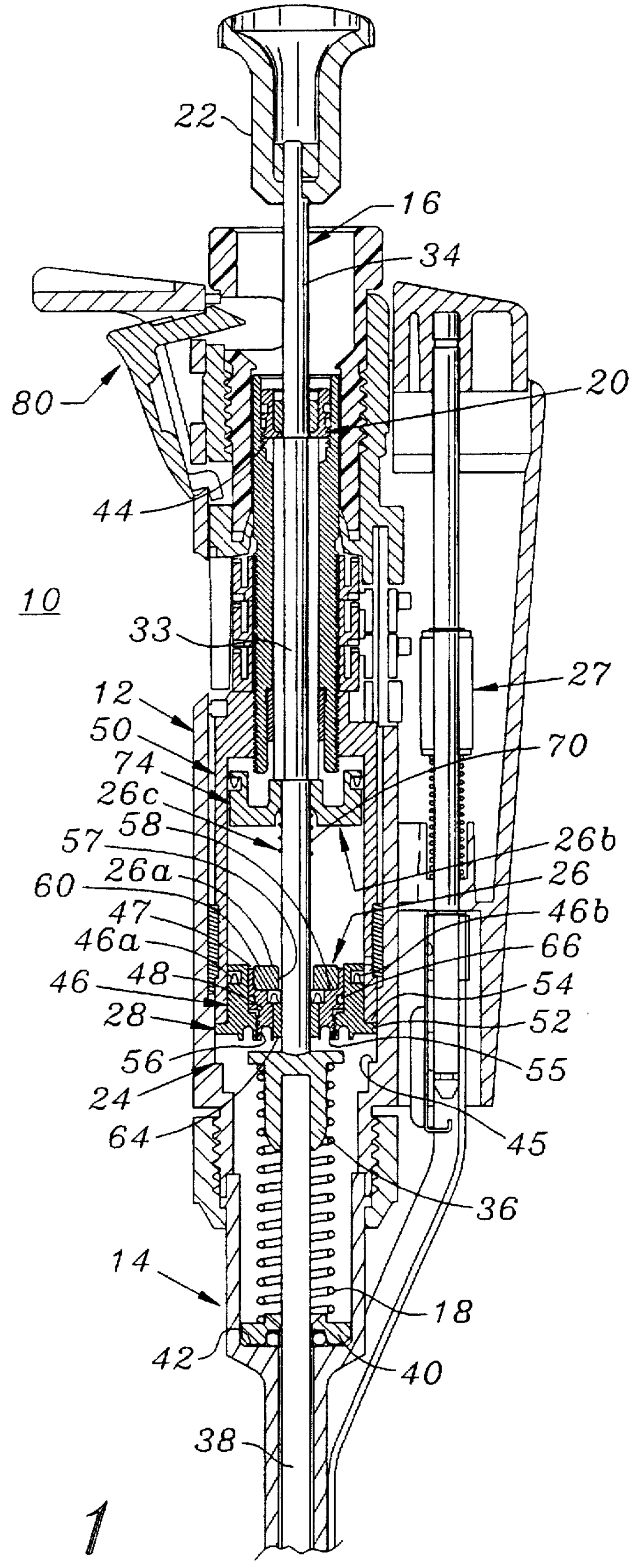
FIG. 1 is a fragmentary side view of an upper portion of a manual pipette, partially in section, and including a first embodiment of a delayed action home position latch according to the present invention and comprising a magnetic latch. The manual pipette is illustrated at an upper stop or start position for a plunger unit included in the pipette.

Referring to FIGS. 1–6, a preferred form of the manual pipette of the present invention is illustrated and represented by the numeral 10. The pipette 10 comprises a hollow pipette body 12 preferably formed from a plastic material. The body 12 is axially elongated and shaped to be hand holdable with a liquid end 14 contiguous with and extending axially from a lower end of the body 12 to receive a disposable pipette tip (not shown). A plunger unit 16 upwardly biased by a return spring 18 is supported for axial movement within the pipette body 12 between an upper stop 20 and a lower stop 24. As shown in FIG. 1, at the upper stop 20, an upper end of an enlarged portion 33 of a plunger 34 of the plunger unit 16 engages the upper stop with an end portion of the plunger unit 16 extending from an upper end of the pipette body 12 to receive a control knob 22. The body 12 and control knob 22 are shaped such that when a pipette user grips the body 12, his or her thumb extends over the top of the control knob such that thumb action of the user will exert a downward force on the plunger unit 16 to move the plunger unit downward from the upper stop 20 against the action of the return spring 18 to the lower stop 24. At the lower stop 24, a bottom stop member 46 which is moveable axially relative to the plunger unit 16 engages an annular shoulder 45 within the pipette body 12. The shoulder 45 defines the lower stop 24 and limits further downward movement of the plunger unit 16 within the pipette body.

Also located within the pipette body 12 is a delayed action home position latch 26 for releasably holding the plunger unit 16 at a "home" position against the continuous upward spring bias of the return spring 18.

Parenthetically, the "home" position is the axial position of the plunger unit 16 in the pipette body 12 where the pipette 10 is ready for its tip to be immersed in a liquid for aspiration or pickup by the pipette 10 and subsequent dispensing into a receptacle. It is also the return position for the plunger unit 16 during repeated pipette operations in drawing liquid into and dispensing liquid from a series of disposable tips. In that regard, the pipette 10 includes a pipette tip ejector 27 such as the improved ejector described in U.S. patent application Ser. No. 08/451,573, filed May 26, 1995 and assigned to the assignee of the present invention. As is common practice in the pipetting of liquids, following each pipette operation, the disposable tip is ejected from the pipette and replaced with a new tip to insure against contamination of the series of liquids samples dispensed by the pipette.

Basically, the delayed action home position latch 26 is designed to engage only after the plunger unit 16 has moved downward through its home position to thereafter releasably connect the bottom stop member 46 to the plunger unit. Thereafter, the bottom stop member 46 moves with the plunger unit 16 and upon an upward return of the plunger unit toward the upper stop 20 engages a home position stop 28 to releasably lock the plunger unit in its home position. By engaging after the plunger unit 16 has past its home position, the delayed action home position latch 26 does not introduce a reactive force which might interfere with the pipette users total control of the rate of downward movement of the piston unit between the upper stop and the lower stop during the dispensing of liquid by the pipette. By engaging to releasably lock the bottom stop member 46 to the plunger unit 16, the delayed action home position latch 26 holds the bottom stop member against the home position stop 28 and holds the plunger unit at its home position against the upward force of the return spring 18 until such time as the pipette user desires to aspirate a measured quantity of liquid sample into the tip of the pipette. Such holding of the plunger unit in its home position does not require the pipette user to exert any downward force on the plunger unit in opposition to the return spring 18. This significantly reduces the hand forces which the pipette user normally would be required to generate using a conventional manual pipette to maintain such a pipette at its home position ready for aspiration of liquid sample. Moreover, it is to be noted that the pipette of the present invention including a delayed action home position latch 26 does not require the strong blow out spring included in conventional manual pipettes. This further reduces the forces which a user of the present invention must generate in moving the plunger unit 16 from its home position to the lower stop position during blow out of residual liquid from the pipette tip.

In its most basic form, the delayed action home position latch 26 as included in the manual pipette 10 of the present invention comprises a first latch member **26*a* on the bottom stop member 46 and a second latch member 26*b* on the plunger unit 16. The first latch member 26*a* is adapted to only engage and latch to the second latch member 26*b* after the plunger unit 16 has past its home position. As previously stated, the bottom stop member 46 carrying the first latch member 26*a* is moveable relative to the plunger unit 16. When the bottom stop member 46 is constructed such that upon a release of the latch 26 and the start of pipette aspiration the bottom stop member will move to a position below the home position stop 28, eg. by the force of gravity acting on the bottom stop member, the latch 26 need only include the first and second latch members 26*a* and 26*b*. Under such conditions the latch members will releaseably lock when the second latch member 26*b* contacts the first latch member 26*a* and the bottom stop member 46 is on the lower stop 24** and the pipette user exerts a downward latching force on the plunger unit.

Preferably however, to insure that the first and second latch members **26*a* and 26*b* only engage or lock after the plunger unit has past through its home position, the delayed action home position latch 26 further includes a spacing member 26*c* between the first and second latch members. The spacing member 26*c* functions to separate the first and second latch members as the plunger unit 16 moves downward from its upper stop position past its home position. After the plunger unit 16 has past its home position, the spacing member 26*c* allows the first and second latch members 26*a* and 26*b* to engage in response to the latch engaging force to releasably lock the bottom stop member 46 to the plunger unit for upward movement therewith until the bottom stop member engages the home position stop 28 to hold the plunger unit in its home position against the upward force of the return string 18**.

Figure 2:
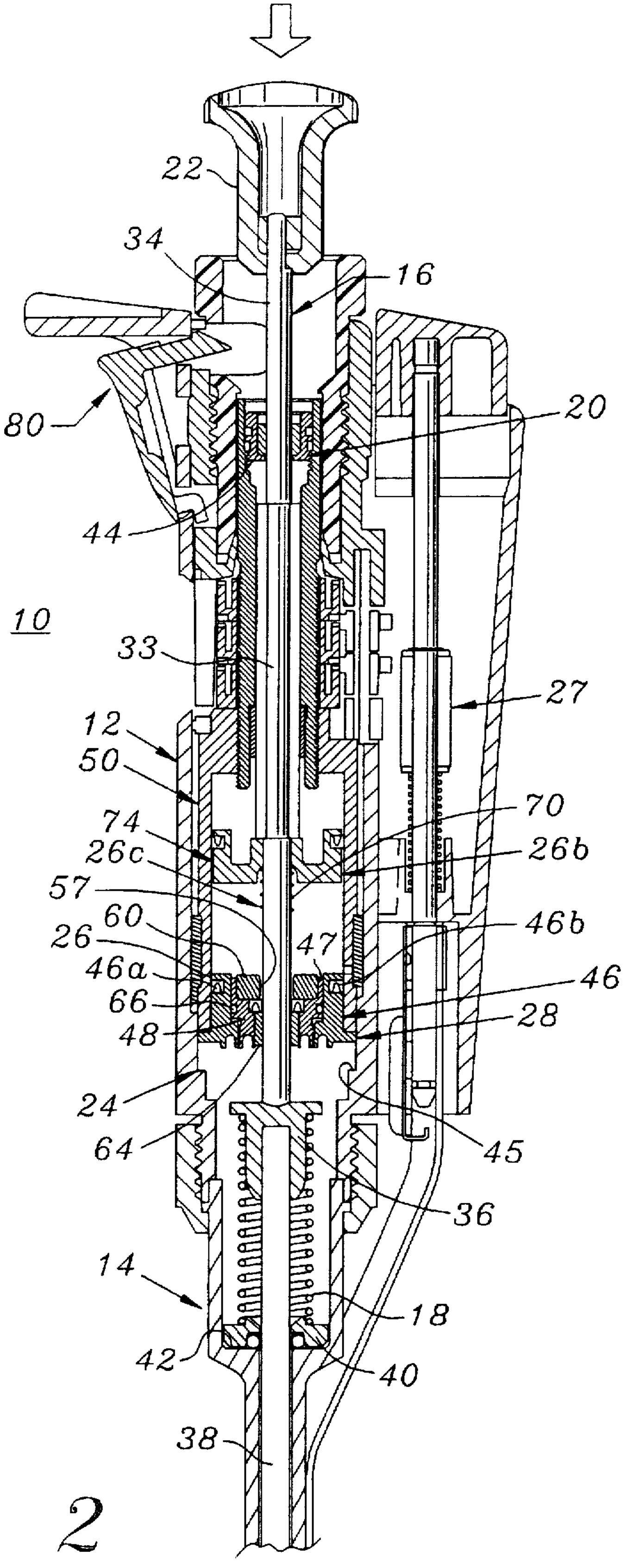
FIG. 2 is a fragmentary side view of the manual pipette of FIG. 1 showing the plunger unit as it begins to move downward from the upper stop position towards a lower stop position.

Referring now more specifically to FIGS. 1 and 2, the illustrated plunger unit 16 for the pipette 10 comprises an axially elongated plunger 34 terminating at its upper end in the control knob 22 and at its lower end in a piston return 36. The piston return 36 is secured to the upper end of a piston 38 moveable axially with the plunger 34 within the liquid end 14. The return spring 18 surrounds the piston 38 with one end bearing on an annular shoulder of the piston return 36 and an opposite end bearing on a seal retainer 40 seated on a shoulder 42 inside the liquid end 14. Thus confined, the return spring 18 continuously exerts an upward force on the piston 38, the piston return 36 and hence the plunger 34 to continuously urge the plunger unit 16 upward toward the upper stop 20, the upper stop being defined by an axially adjustable shoulder 44 within the body 12 of the pipette.

Figure 3:
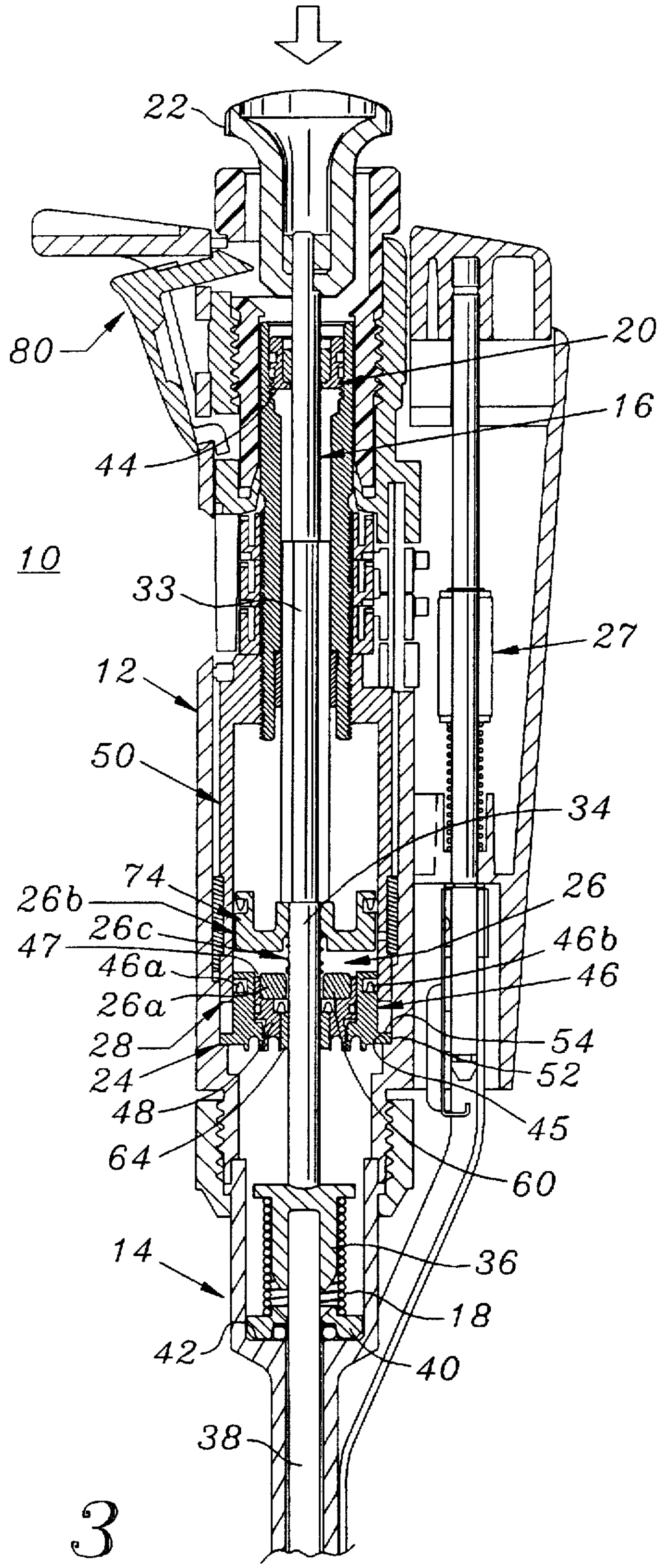
FIG. 3 is a fragmentary side view of the manual pipette of FIG. 1 showing the plunger unit as it continues to move downward within the pipette housing.
Figure 4:
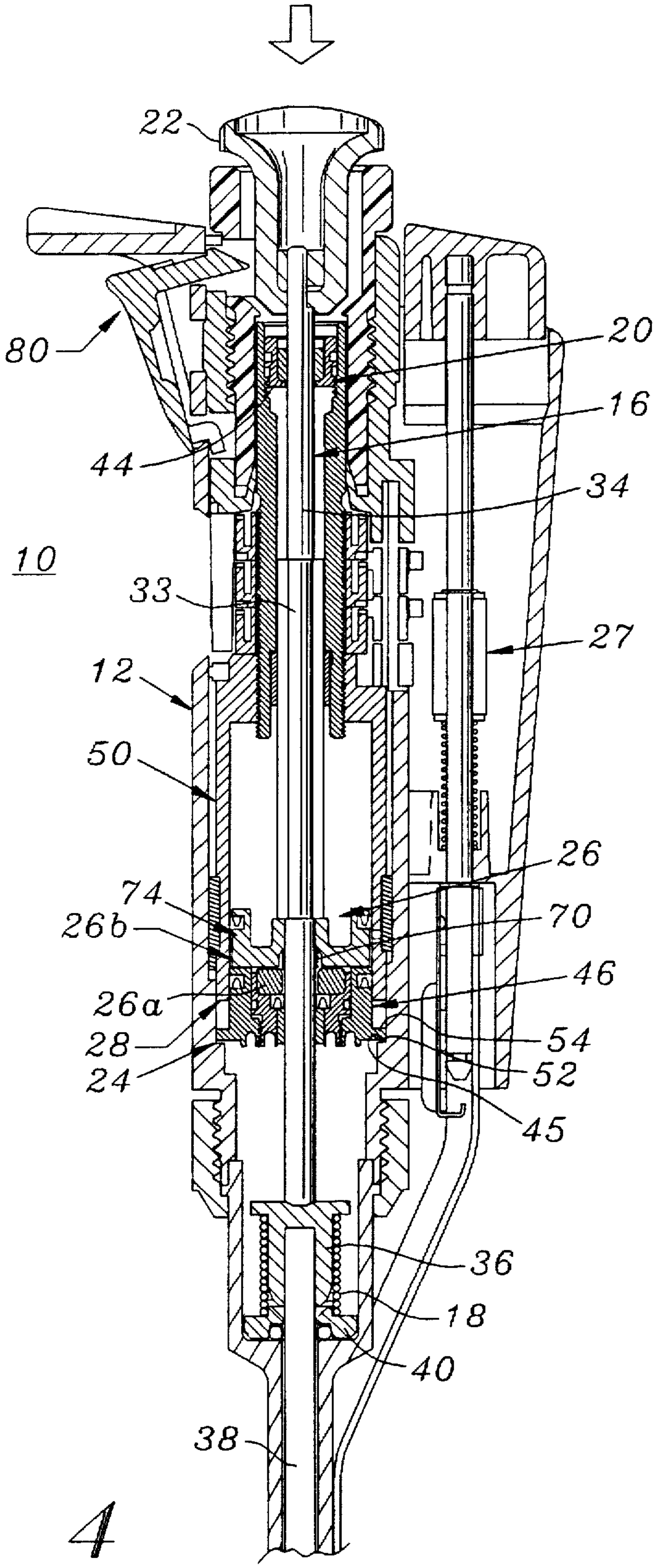
FIG. 4 is a fragmentary side view of the manual pipette of FIG. 1 showing the plunger unit as it continues to move downward within the pipette housing.

As illustrated most clearly in FIG. 4, the "home" position for the plunger unit 16 is defined by the bottom stop member 46. The bottom stop member 46 is generally cylindrical in shape having an inwardly stepped inner surface around a central opening 47 for receiving a lower end of the plunger 34 and a holder 48 as illustrated most clearly in FIG. 3. As shown, the bottom stop member 46 extends axially into the lower end of a cylinder 50 fixed within the pipette body 12 to axially receive the plunger 34. A seal **46*a* is seated in an annular groove 46*b* on an outer surface of the bottom stop member 46. The seal 46*a* creates a fluid seal and sliding friction between the bottom stop member 46 and the cylinder 50 such that an annular flange 52 extending from a bottom of the bottom stop member normally engages a lower annular surface 54 of the cylinder 50 to limit upward axial movement of the bottom stop member into the cylinder and relative to the pipette body 12. In this manner, the surface 54 defines the home position stop 28**.

As shown, the lower end of the central opening 47 is of reduced diameter and includes a threaded portion 55 for mating with similar threads on an outer surface of a axial neck 56 of the holder 48. In this regard, the holder 48 like the bottom stop member 46 is of generally cylindrical shape having an inwardly stepped inner surface around a central opening 57 for receiving a lower end of the plunger 34 and defining annular shoulder 58 between a top of a holder and the neck 56. The shoulder 58 defines a flat support surface for either the first latch member **26*a* or the second latch member 26*b* of the home position latch 26. In the embodiment of the latch 26 depicted in FIGS. 1–6, the latch is a magnetic latch with the first latch member 26*a* comprising a magnet 60 in the bottom stop member 46 and with the second latch member 26*b* comprising a ferromagnetic pull piece or dashpot piston 74 secured to the plunger 34 for axial movement within the cylinder 50. The spacing member 26*c* comprises a spacing spring 70 coiled around a portion of the plunger 34 and secured at an upper end to the pull piece 74. As will be described more fully with respect to FIGS. 3 and 4, the spacing spring 70 is designed to compress as the bottom stop member 46 contacts the lower stop 24 and the pipette user continues to apply a downward force to the plunger unit 16 to move the plunger unit toward the bottom stop member 46. This allows the magnet 60 to lock to the pull piece 74 and thereby releasably engage the home position latch 26**.

As depicted in FIGS. 1–6, magnet 60 comprises an annular magnet and the shoulder 58 provides support for the annular magnet with its central opening receiving the plunger 34 and its top surface extending slightly above an upper annular surface of the holder 48. A plunger guide bushing 64 is seated tightly within the opening of the neck 56 of the holder 48 to provide a sliding surface for the plunger 34. An O-ring 66 is seated in an annular slot in an outer surface of the holder 48 to provide friction between the holder and the bottom stop member 46 to secure the adjustment of the holder relative to the bottom stop member.

Figure 6:
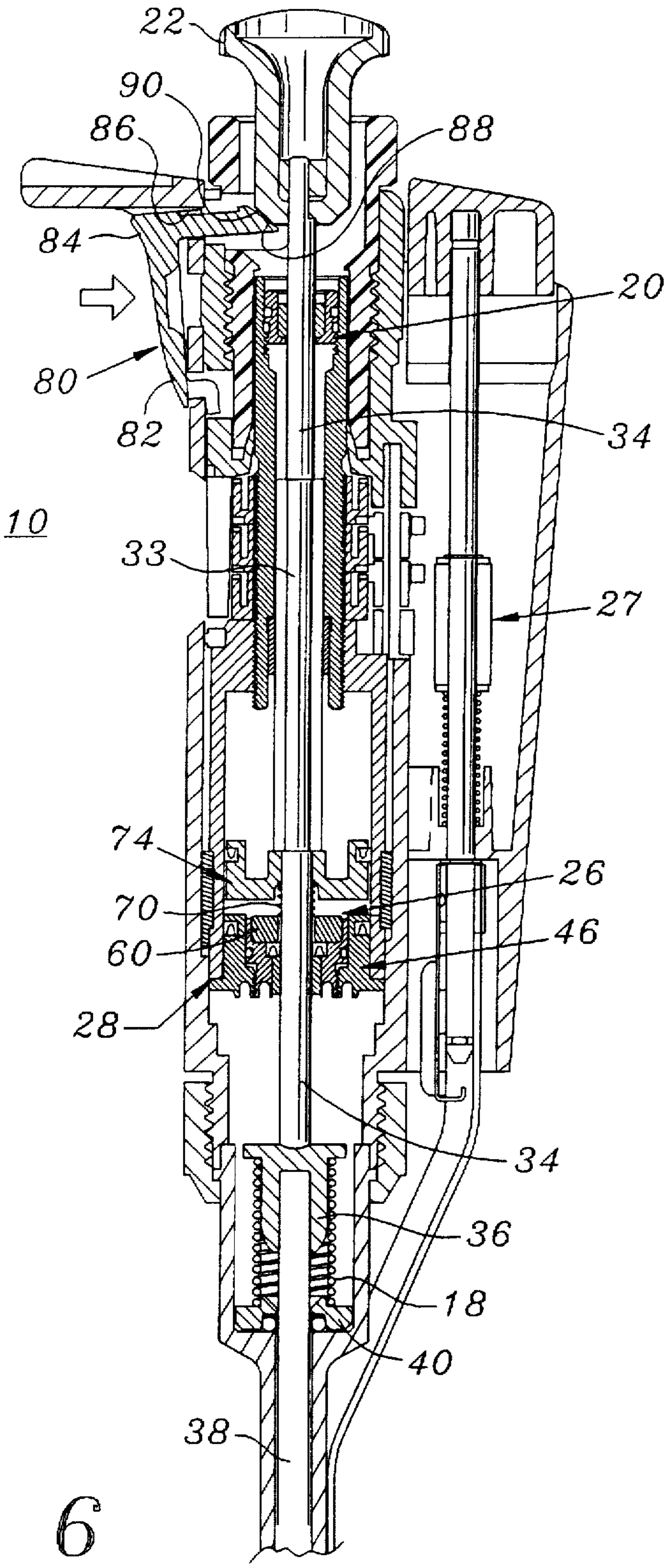
FIG. 6 is a fragmentary side view of the manual pipette of FIG. 5 showing the pipette immediately after a release of the home position latch by a user actuation of a trigger mechanism to force the plunger unit upward from its home position and to begin aspiration of the sample into the tip of the pipette.

As previously described and as shown for example in FIG. 1, the bottom stop member 46 is normally seated within the cylinder 50 with its annular flange 52 against a lower annular surface 54 of the cylinder defining a "home" position for the bottom stop member 46. As generally described above relative to the operation of the home position latch 26 and as depicted in FIG. 4, the surface 54 also forms the home position stop 28 for the plunger unit 16 to define the "home position" for the plunger unit. Considering now more specifically the overall operation of the pipette 10 with the magnetic home position latch 26 beginning with FIG. 1 and continuing through FIG. 6, FIG. 1 depicts the pipette 10 at its upper stop position with the upper surface of the enlarged portion 33 of the plunger unit 16 bearing on the lower surface 44 comprising the upper stop 20. To ready the pipette 10 for the aspiration of a measured quantity of the liquid sample into a pipette tip secured to a lower end of the pipette body 12, a pipette user grasps the pipette body 12 in one hand with his or her thumb over the control knob 22. The user then exerts a downward thumb force on the control 22 as indicated by the arrow in FIG. 2. This causes the plunger 16 to move downwardly within the pipette body 12 from the upper stop position of FIG. 1 as shown in FIG. 2. Such downward movement of the plunger 16 is opposed by the upward force of the return spring 18. The pipette user continues to exert a downward thumb force on the control knob 22 until the spacing spring 70 engages a top surface of the magnet 60 as depicted in FIG. 3. Continued downward thumb force on the control knob 22 then causes the bottom stop member 46 to move downwardly with the plunger unit 16 until the annular flange 52 engages the annular shoulder 45 defining the lower stop 24 for the pipette 10.

Figure 5:
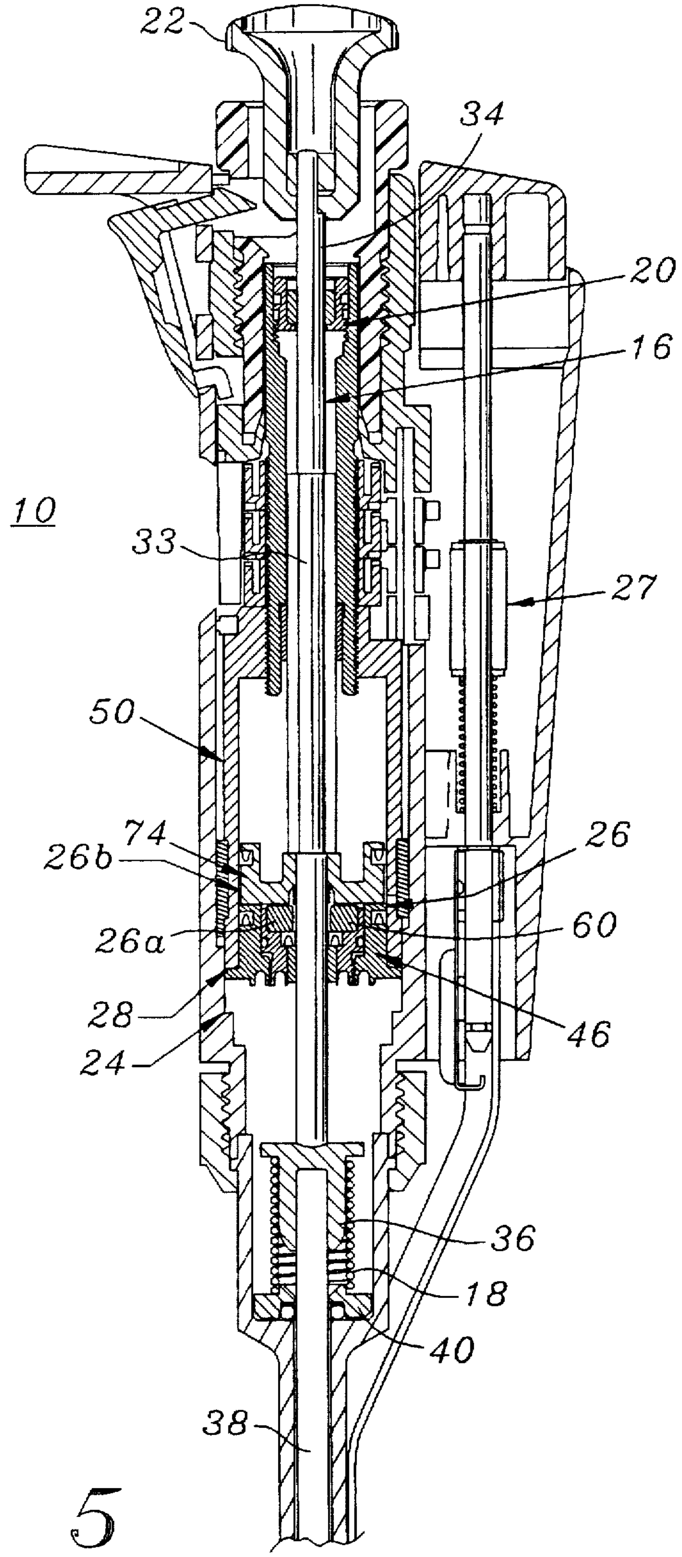
FIG. 5 is a fragmentary side view of the manual pipette of FIG. 4 after the plunger unit has been released by its user at the lower stop and allowed to move upward in response to the force of a return spring within the pipette housing.

As depicted in FIG. 4, continued downward thumb force on the control knob 22 then produces a compression of the spacing spring 70 to allow the pull piece 74 to engage the top surface of the bottom stop member 46 releaseably locking the pull piece to the magnet 60 and thereby engaging the home position latch 26. This, in turn, releaseably locks the bottom stop member 46 to the plunger unit 16 such that upon a release of the control knob 22 by the pipette user, the bottom stop member 46 moves upwardly with the plunger unit 16 in response to the upward force of the return spring 18. Such upward movement of the bottom stop member 46 and plunger unit 16 continues until the flange 52 engages the lower annular surface 54 of the cylinder 50 defining the home position stop 28 for the pipette 10. Upon engaging the home position stop 28, further upward movement of the bottom stop member 46 and plunger unit 16 is halted to maintain the plunger unit 16 in its home position as depicted in FIG. 5. The pipette 10 will remain in the home position without the pipette user exerting any force on the plunger unit until such time as it is desired to aspirate liquid into the tip of the pipette. At that time, the pipette user moves the tip of the pipette into the receptacle containing the liquid sample and releases the home position latch to allow the plunger unit to return to its upper stop position as shown in FIG. 1 under the influence of the return spring 18. Such release of the home position latch is accomplished by the pipette user squeezing a trigger mechanism 80 as depicted in FIG. 6. Basically, the trigger mechanism 80 comprises a rocker arm 82 hinged at a lower end to the pipette body 12 with the arm extending vertically upward along the body toward a top thereof with a nose portion 84 extending through a side opening 86 in a top piece of the body 12 in the direction of the plunger 34 and control knob 22. The rocker arm 82 is normally biased away from the plunger 34. When the pipette user presses inwardly on the rocker arm 82, a cam surface on an end of the nose portion 84 engages a complimentary cam surface 90 on a bottom of the control knob 22 to urge the control knob and hence the plunger unit 16 upwardly within the pipette body 12. Such upward movement of the plunger unit causes the pull piece 74 to separate from the magnet 60 to thereby release the home position latch 26 allowing the plunger unit to move upwardly independent of the bottom stop member 46 which remains in its home position as shown in FIG. 6. The plunger unit 16 continues its upward travel until it reaches its upper stop position as depicted in FIG. 1. Aspiration of the measured quantity of liquid into the tip of the pipette is then complete and the pipette is ready for dispensing of the sample into a receptacle. The pipette user then moves the pipette over the receptacle and exerts a downward thumb force on the control knob 22 as depicted in FIGS. 2, 3 and 4 to move the plunger unit from the upper stop position through its home position to the lower stop position where the home position latch 26 is engaged as depicted in FIG. 4. Such downward movement of the plunger unit 16 is under total control of the pipette user who is able to manually regulate the rate of downward movement and the dispensing of sample from the tip of the pipette 10. Such control over the rate of downward movement of the plunger unit is in no way impaired by an operation of the home position latch 26 which does not occur until after the plunger unit 16 has passed its home position and is in or at the end of blowout of residual sample at the lower stop position shown in FIG. 4. Further, in its downward travel from the home position to the lower stop position, only the return spring 18 opposes downward travel of the plunger unit. This means that with the pipette 10 of the present invention, the pipette user only needs exert a downward force sufficient to overcome the upward force of the return spring rather than exerting a much larger force as is required in the use of conventional manual pipettes where such motion as opposed by a strong blow-out spring. Thus, the improved pipette 10 of the present invention allows the pipette user total control over the rate of plunger unit movement during the dispensing of liquids by the pipette and minimizes the thumb forces which the pipette user must generate in dispensing liquids from the pipette. This materially reduces the fatigue of the pipette user particularly in performing a series of pipetting operations and enhances the user's ability to carefully manually control the rate of operation of the pipette to improve repeatability of pipetting results.

The same improved operational features associated with the pipette 10 including the magnetic home position latch 26 are associated with the pipette 10 illustrated in FIGS. 7 through 10 wherein the home position latch 26 comprises a mechanical latch. More particularly, in the mechanical home position latch 26, the first latching member 26*a* comprises a first lock member 92 formed by a downward and laterally outward sloping surface on the under side of a cam 94 at the upper end of an arm or finger 96 extending upwardly from the base of a cavity 98 in a top of the bottom stop member 46. The second latching member 26*b* comprises a second locking member 100 formed a downwardly and laterally outwardly sloping annular cam surface on an annular nub 102 extending from the plunger 34 immediately below the dashpot piston 74. The spacing member 26*c* comprises the axially extending arm or a finger 96 and preferably comprises a plurality of such fingers spaced circumferentially around the plunger 34. As illustrated, the fingers 96 and the nub 102 carry complimentary cam surfaces 94*a* and 102*a* for exerting a latch engaging force on the fingers 96 to outwardly deflect the fingers and permit the locking members to engage and releaseably lock together thereby defining an engaged condition for the mechanical home position latch 26.

Figure 7:
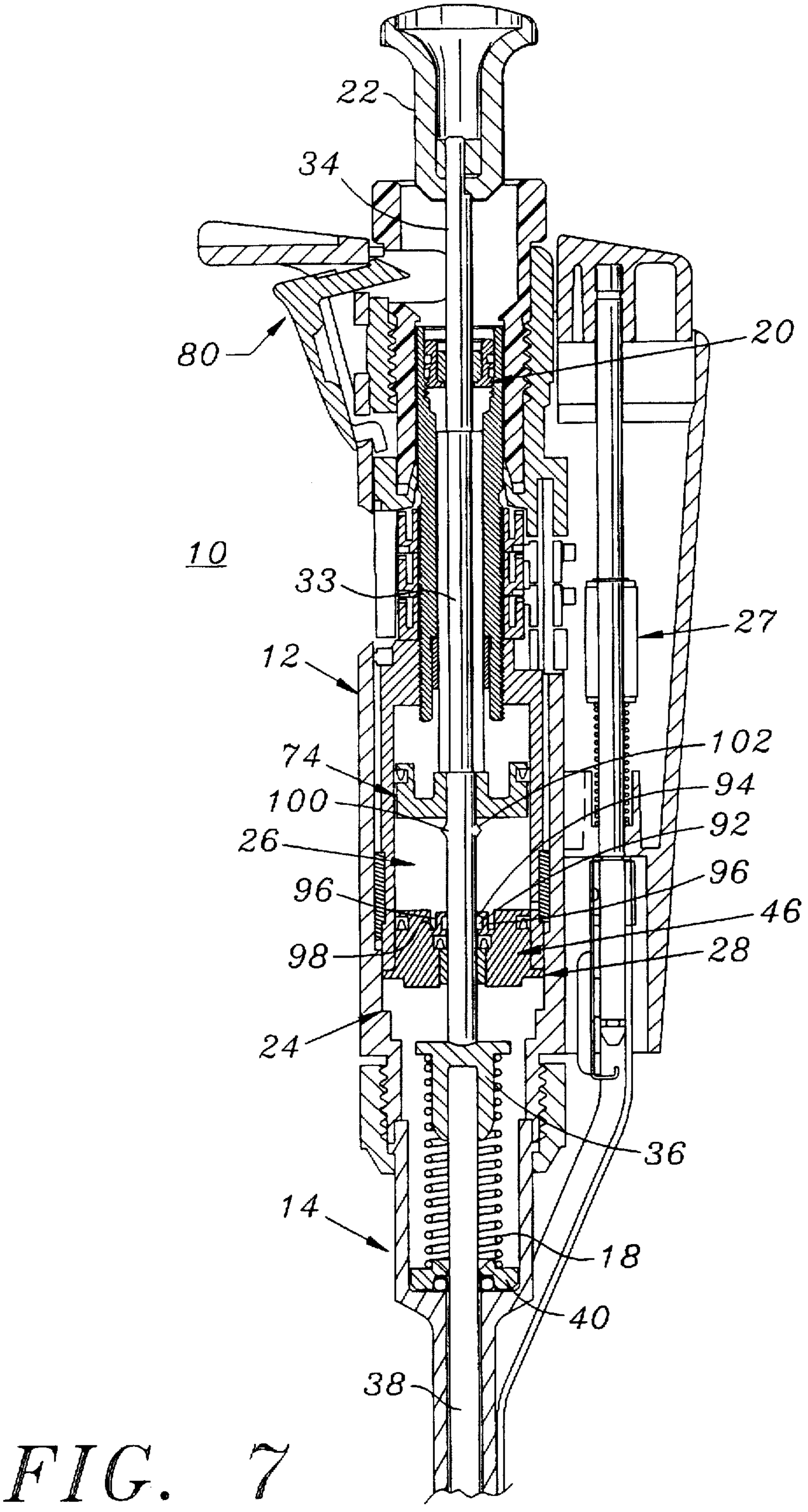
FIG. 7 is a fragmentary partially in section side view of a manual pipette similar to that shown in FIGS. 1–6 and including a second embodiment of the delayed action home position latch comprising a mechanical latch. The plunger unit of the manual pipette is illustrated at a position just below the upper stop or start position for the plunger unit as the plunger unit moves toward the lower stop in response to a downward thumb force of the pipette user on the knob secured to the top of the plunger unit.
Figure 8:
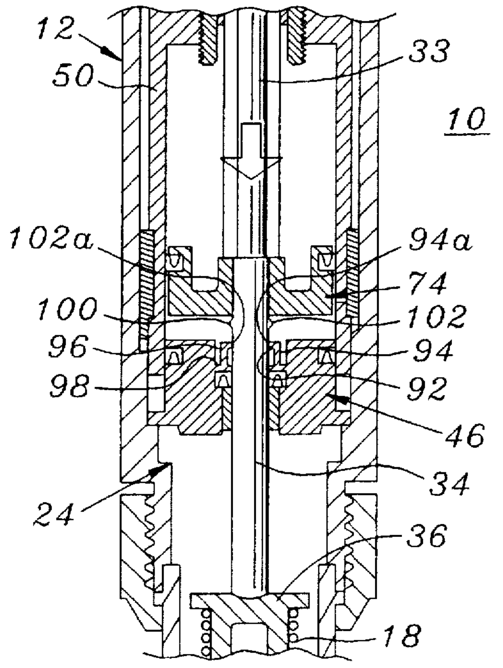
FIG. 8 is an enlarged sectional side view of the mechanical latch of FIG. 7 showing a spacing member separating first and second locking members of the latch as the plunger unit moves with the bottom stop member to engage the lower or bottom stop.
Figure 9:
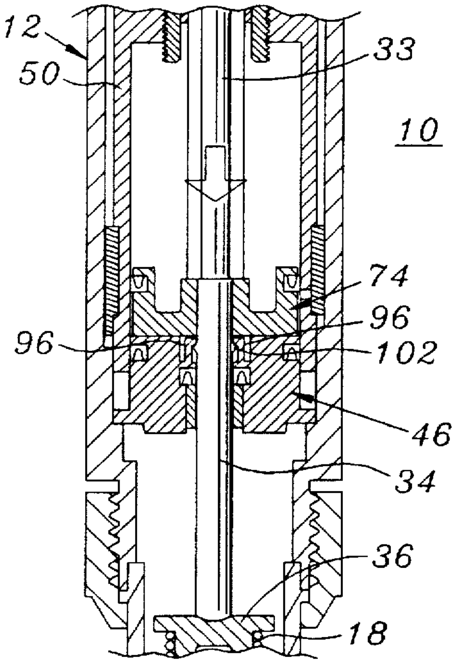
FIG. 9 is a side view of the mechanical latch as shown in FIG. 8 showing the bottom stop member at the lower stop and the plunger unit forced downward to laterally deflect the spacing member, comprising axially extending fingers extending from the bottom stop member, to allow the first and second locking members to engage and the home position latch to releasably lock the plunger unit to the stop member.
Figure 10:
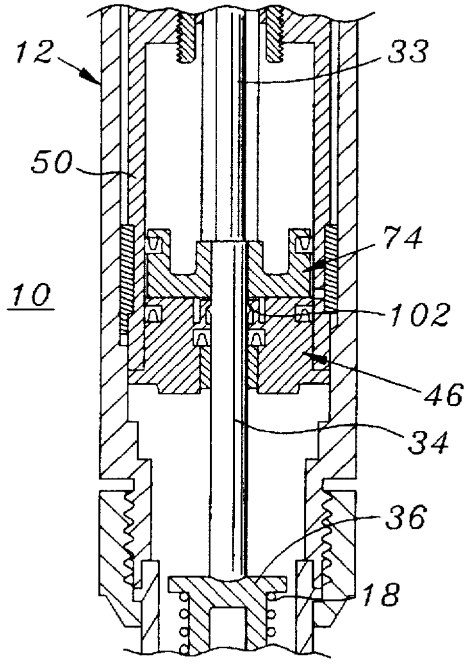
FIG. 10 is a side view of the mechanical latch as shown in FIG. 9 showing the plunger unit after it has been released by the pipette user and allowed to move upward under the influence of the return spring until the bottom stop member has engaged the home position stop to define the home position for the plunger unit within the pipette housing readying the plunger unit for aspiration of a measured quantity of a liquid sample into a tip of the pipette upon a release of the home position latch as depicted in FIG. 6.

Thus constructed, as the pipette user exerts a downward thumb force on the control knob 22 to move the plunger unit 16 downward from its upper stop position toward the lower stop position (as shown in FIG. 7), the nub 102 is moved downwardly until it engages the fingers 96. Continued downward thumb force on the plunger unit 16 then moves the bottom stop member 46 with the plunger unit 16 until the bottom stop member engages the lower stop 24 as shown in FIG. 8. Further downward force on the plunger unit causes the complimentary cam surfaces to tightly engage and the nub 102 to outwardly deflect the fingers 96 allowing the nub to move downwardly until the locking surfaces 92 and 100 engage to releaseably lock the bottom stop member 46 to the plunger unit 16 as shown in FIG. 9. Then, a release of the thumb force on the plunger unit 16 by the pipette user allows the bottom stop member 46 to move with the plunger unit upward within the pipette body 12 in response to the upward force of the return spring 18. Such upward movement continues until the bottom stop member 46 engages the home position stop 28 as depicted in FIG. 10. This maintains the plunger unit 16 in its home position ready to aspirate a measured quantity of liquid into the tip of the pipette. As with the pipette of FIGS. 1 through 6, such aspiration is produced by the pipette user moving the tip of the pipette to the container of the liquid sample. An actuation of a trigger mechanism 80 then forces the plunger unit upward relative to the stationary bottom stop member 46 causing the nub 102 to disengage from the fingers 96 and effect a release of the home position latch. Then, the plunger unit 16 continues its upward movement to the upper stop 20 in response to the upward force of the return spring 18. At the upper stop 20, aspiration of the sample liquid is complete and the pipette 10 is ready to dispense the sample into a receptacle in the manner previously described.

Thus, with the pipette 10 including the mechanical home position latch, the pipette user has total control over the dispensing of sample with the pipette and the home position latch maintains the plunger in its home position without requiring the pipette user to exert a downward force on the plunger unit to maintain the plunger unit in its home position ready for aspiration of a sample liquid. In this manner, the pipette including the mechanical home position latch like the pipette including the magnetic home position latch overcomes all of the shortcomings of prior mechanical pipettes including home position latches.

In some pipetting applications, it is desired to pipette highly viscous liquids which tend to adhere to the inner walls of pipette tip even after "blow out" operation; that is, manual movement of the plunger unit from the home position to the lower stop position to blow all excess liquid from the tip. To more accurately pipette such highly viscous liquids, a method of pipette operation has been developed known as "reversed mode pipetting". In reversed mode pipetting, a disposable tip is affixed to the lower end of the pipette and the push button completely depressed to move the plunger unit to the lower stop position. The tip is then emersed in the sample liquid and the push button released to allow the plunger unit to return to the upper stop position under the influence of the return spring. The operator then pauses for one or two seconds or longer to allow the viscous liquid in the pipette tip to reach equilibrium. Any excess liquid is then wiped from the outside of the tip without touching the orifice.

To dispense the viscous liquid from the pipette tip, the end of the tip is placed against the inner wall of a receiving vessel and the pipette push button depressed to the home position where it is held for one to two seconds or long enough for the liquid within the pipette tip to again reach equilibrium.

The tip is then removed from the receiving vessel without blowing out the liquid remaining in the tip. The excess liquid within the tip is then either returned to the sample or discarded with the used tip. Alternatively, the pipette tip may be reused to aspirate another sample of the viscous liquid by the user continuing to exert a downward force on the push button to maintain the plunger unit at its home position while inserting the tip in the viscous liquid and then releasing the push button to allow the plunger unit to return to its upper stop in response to the force of the return spring. The viscous liquid sample is then dispensed from the tip in the manner previously described with downward movement of the plunger unit being halted at the home position.

Since in reverse mode pipetting it is important that the pipette user be able to detect the home position for the plunger unit during the dispense operation, the embodiments of the present invention illustrated and described with respect to FIGS. 1–10 may be modified for use in reverse mode pipetting in the manners illustrated in FIG. 11–16.

Figure 11:
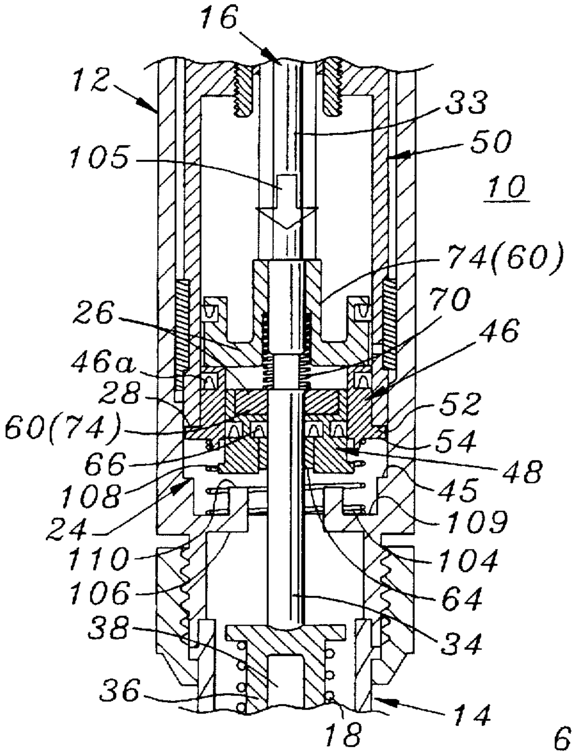
FIG. 11 is an enlarged sectional side view of a magnetic latch similar to that depicted in FIGS. 1–6 including a magnet holder separate from the bottom stop member and moveable axially with respect to the bottom stop member in response to a downward force exerted by a spacing spring, the bottom stop member being maintained in the "home position" by a secondary spring.
Figure 12:
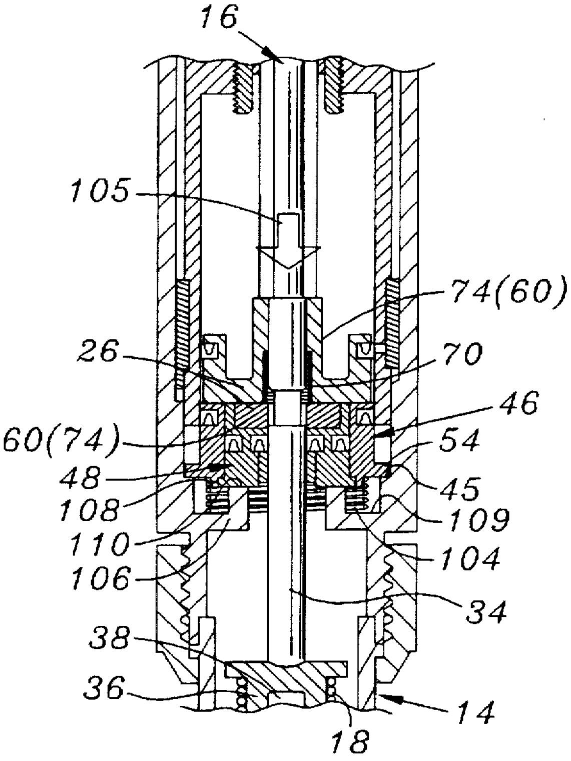
FIG. 12 is a fragmentary side view of the latch illustrated in FIG. 11 showing the plunger unit at the lower stop for the pipette with the magnetic latch engaged.
Figure 13:
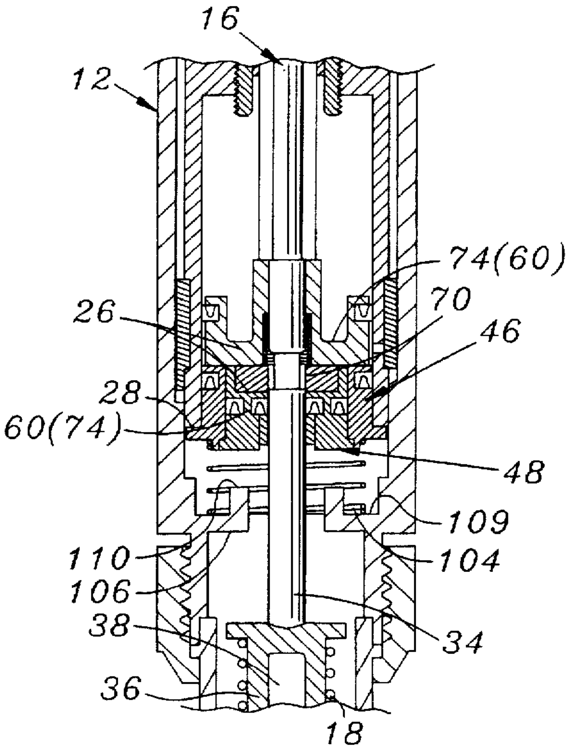
FIG. 13 is a fragmentary side view of the latch of FIG. 12 illustrating the engaged latch after the plunger unit has been released and returned to its "home" position by the return spring.
Figure 14:
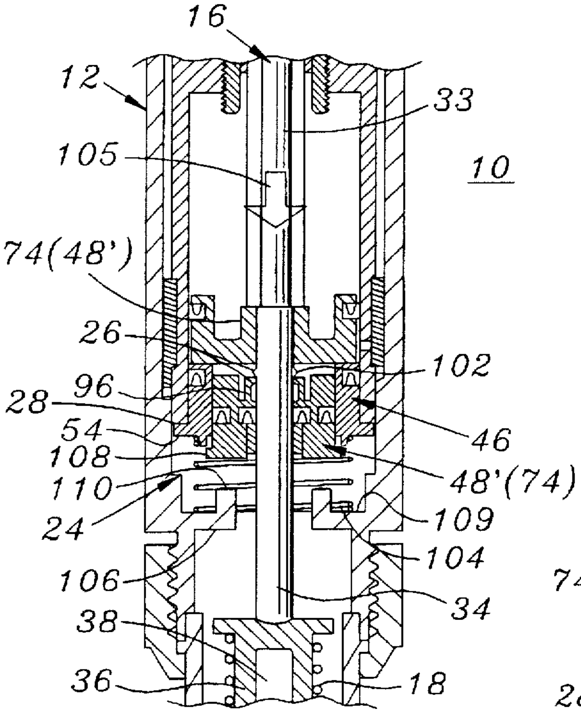
FIG. 14 is an enlarged fragmentary side view of an alternate version of the mechanical latch shown in FIGS. 7–10 illustrating the plunger unit in an axial position wherein the latch nub engages the fingers comprising the spacing member, the latch being modified to include a separate latch piece axially removable relative to the bottom stop member, the bottom stop member being retained at its "home" position by a second spring.
Figure 15:
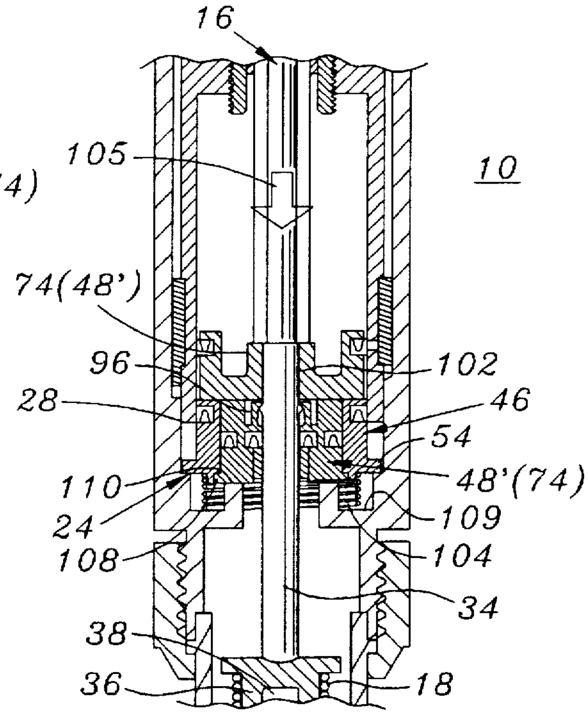
FIG. 15 is a fragmentary sectional side view of the latch of FIG. 14 with the plunger unit at the lower stop and the latch nub engaged by the finger.
Figure 16:
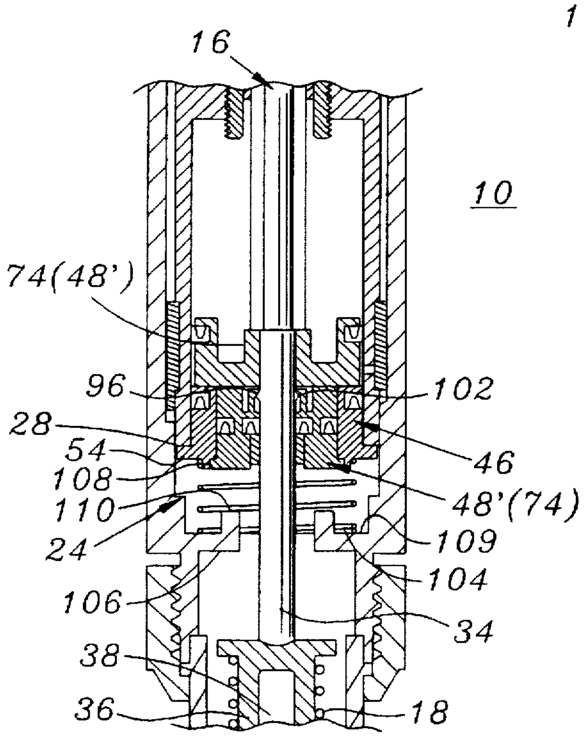
FIG. 16 is a fragmentary sectional side view of the latch of FIG. 15 depicting the latch after the plunger unit has been released to return to its "home" position in response to upward force of the return spring.

FIGS. 11–13 illustrate a modification of the magnetic home position latch illustrated in FIGS. 1–6 while FIGS. 14–16 depict a modification of the mechanical latch illustrated in FIGS. 7–10 which accommodate pipette use in reverse mode pipetting.

Basically, the magnetic latch 26 described and illustrated in FIGS. 1–6 is modified by (i) separating the bottom stop 46 from the holder 48 for the magnet 60, (ii) adding a second spring 104 within the pipette body 12 between a spring retainer 106 and a bottom of the bottom stop member 46 and (iii) adding a second lower stop 110 for the holder 48. As illustrated in FIGS. 11–13, the magnet holder 48 is coaxial with the plunger 34 and adapted to axially receive the plunger, the plunger guide bushing 64 and the magnet 60.

The spring retainer 106 comprises an annular step from the inside of the pipette body 12 including laterally extending surfaces 109 for receiving and supporting a bottom of the spring 104 and a top laterally extending surface defining the second lower stop 110 for the holder 48. With the spring 104 thus supported on the surfaces 109, it extends upwardly to engage the bottom surface of the bottom stop member 46 and continuously exerts an upward force on the bottom stop member urging it against the home position stop 28 as shown in FIG. 11.

Thus, in operation, as the plunger unit 16 is moved downward by the pipette user exerting a downward force on the push button 21 (as depicted by the arrow 105), the spacing spring 70 engages the top of the magnet 60 and urges the magnet 60 and the magnet holder 48 downward relative to the bottom stop member 46 until the holder 48 engages the second lower stop 110. The bottom stop member 46 is retained against the home position stop 28 by the second spring 104. This is the state of the pipette 10 depicted in FIG. 11. As there shown, the bottom of the dashpot piston 74 (comprising the ferromagnetic pull piece) engages the top of the bottom stop member 46—the bottom stop member bearing upwardly against the home position stop 28. The pipette user senses the resistance to further downward movement produced by such contact and by the second spring 104 and hence senses that the plunger unit 16 has reached its home position. It should be noted from FIG. 11 that the home position latch 26 has not engaged and the pull piece 74 is separated from the magnet 60.

The pipette user then continues to exert a downward force represented by the arrow 105, on the plunger unit 16. As this occurs, the dashpot piston 74 drives the bottom stop member 46 downward away from the home position stop 28 to the lower stop 24, as depicted in FIG. 12. At that position, the dashpot piston 74 comprising the ferromagnetic pull piece contacts the magnet 60 to engage the home position latch 26 locking the magnet 60, the magnet holder 48 and the bottom stop member 46 to the dashpot piston 74. With regard to the locking of the bottom stop member 46, it should be noted that an annular flange 108 at a bottom side of the magnet holder 48 engages the bottom surface of the bottom stop member 46 such that upon upward movement of the dashpot piston, magnet and magnet holder combination, the bottom stop member 46 moves as a unit with the combination upward until the bottom stop member engages the home position stop 28 as shown in FIG. 13. Such upward movement of the plunger unit 16 is in response to the pipette user releasing the push button 22 and in response to the upward forces exerted by the return spring 18 and the second spring 104.

Thus, when it is desired to use the pipette 10 (having the latch mechanism shown in FIGS. 11–13) in reversed mode pipetting, the pipette user simply pushes downward on the push button 22 driving the plunger unit 16 to the lower stop position. The pipette user then inserts the pipette tip in the viscous liquid sample and releases the push button. The liquid sample is drawn into the pipette tip as the plunger unit 16 moves upward from the lower stop position illustrated in FIG. 12 to the home position illustrated in FIG. 13. At the home position of FIG. 13, the operator actuates the trigger mechanism 80 illustrated in FIGS. 1–6 allowing the plunger unit 16 to return to the upper stop position in response to the upward force of the return spring 18. The pipette user then moves the pipette to the receiving vessel. With the end of the pipette tip against a sidewall of the vessel, the pipette user presses on the push button 22 to drive the plunger unit 16 downward from the upper stop position toward the home position. When the pipette user senses that the plunger unit 16 has reached the home position, by sensing the increase in force opposing downward movement of the push button, the user halts movement of the plunger unit and removes the pipette from the receiving vessel. The pipette user then either ejects the remaining sample liquid from the tip or ejects the used tip containing the excess liquid. Alternatively, the pipette user may retain the pipette in its home position by continuing to exert a downward force on the push button 22 to maintain the plunger unit 16 at its home position while again inserting the tip of the pipette into the sample liquid. Then, upon a release of the push button 22, the plunger unit returns upward to the upper stop position having aspirated another sample liquid into the pipette tip.

The same operational features are associated with the pipette 10 including the alternative form of the mechanical latch 26 illustrated in FIGS. 14–16.

As illustrated in FIG. 14, the bottom stop member 46 is separate from, coaxial relative to and surrounds a latch piece 48'. The latch piece 48' is similar in structure to the magnet holder 48 of FIGS. 11–13 and is moveable axially relative to the plunger unit 16 and the bottom stop member 46. Further, the latch piece 48' supports fingers 96 comprising the spacing member 26c and the first lock member 92 of the mechanical home position latch 26 illustrated and described with respect to FIGS. 7–10. As in the embodiment of FIGS. 7–10, the mechanical latch of FIGS. 11–13 includes a second lock member comprising an annular nub 102 extending from plunger 34. Further, as in the embodiment illustrated in FIGS. 11–13, the modified mechanical latch 26 includes the second spring 104 extending between the spring retainer 106 and a bottom of the bottom stop member 46 to continuously urge the bottom stop member upward against the home position stop 28.

Thus constructed, as the plunger unit 16 is driven downward by the force indicated by the arrow 105, the annular nub 102 engages the upper cam surface of the fingers 96 moving the latch piece 48' downward axially relative to the bottom stop member 46 until the latch piece 48' engages the lower stop 110. The bottom stop member 46 remains stationery against the home position stop 28 in response to the upward force exerted by the second spring 104. Continued downward movement of the plunger unit 16 causes the dashpot piston 74 functioning as a contact member to engage the top surface of the bottom stop member 46 as shown in FIG. 14. Thereafter, continued downward movement of the plunger unit 16 drives the bottom stop member 46 away from the home position stop 28 until the bottom stop member 46 engages the lower stop 24 as depicted in FIG. 15. As this occurs, the nub 102 is driven downward relative to the stationary latch piece 48' and the fingers 96 deflect outwardly to accommodate such downward movement of the plunger 34 until the fingers snap inwardly and the complimentary cam surfaces on the fingers and nub engage as shown in FIG. 15 to engage the mechanical home position latch.

Thereafter, a release of the push button 22 causes the plunger unit 16, latch piece 48' and bottom stop member 46 to move upwardly as a unit until the bottom stop member 46 engages the home position stop 28 as illustrated in FIG. 16. The home position latch then maintains the plunger unit at its home position until such time as the trigger mechanism 80 illustrated in FIGS. 1–6 is activated to move the plunger 34 and nub 102 upwardly releasing the home position latch and allowing the plunger unit 16 to return to its upper stop position under the influence of the return spring 18.

Thus structured, the pipette 10 including the alternate version of the mechanical latch illustrated in FIGS. 14–16 functions in reverse mode pipetting in the same manner previously described with respect to the modified magnetic latch of FIGS. 11–13.

While particularly preferred embodiments of the present invention have been illustrated and described herein above, it is to be appreciated that changes and modifications may be made in the preferred embodiments without departing from the spirit of the present invention. For example, in both the magnetic latch and mechanical latch versions of the present invention, the active elements comprising the latch may be reversed. For example, for the magnetic latch, rather than the pull piece 74 being secured to move with the plunger 34, the magnet 60 may be thus secured and rather than the holder 48 securing the magnet 60, the holder 48 may secure the pull piece 74. Such a reversal of parts is indicated, by way of example, in FIGS. 11–13 where "(60)" is placed adjacent to the number "74" and "(74)" is placed adjacent to the number "60". In a similar manner, the active elements of the mechanical latch illustrated in FIGS. 7–10 and 14–16 may be reversed with the fingers 96 being fixed to move with the plunger 34 and the pull piece 74 being supported by the holder 48 or latch member 48'. Thus, by way of example, in FIGS. 14–16, "(48')" is placed adjacent to the number "74" and "(74)" is placed adjacent to the number "48'" to indicate the reversal of parts. Accordingly, the present invention is to be limited in is scope only by the following claims.

We claim:

1. A manual pipette for repeatably aspirating and dispensing a predetermined quantity of liquid, comprising:

a hollow hand holdable pipette body containing an upper stop, a lower stop and a home position stop;

a plunger unit mounted within the pipette body for manual movement by a pipette user downward from the upper stop, past the home position stop to the lower stop, the upper, lower and home position stops defining upper, lower and home stop positions for the plunger unit, the home position being a predetermined starting position for the plunger unit for repeatable aspiration of the predetermined quantity of liquid into a tip extending from the pipette body when the tip is immersed in the liquid;

a return spring within the pipette body for generating an upward force opposing downward movement of the plunger unit away from the upper stop and for returning the plunger unit to the upper stop position upon a release of the plunger unit;

a bottom stop member moveable relative to the plunger unit within the pipette body between the lower stop and the home position stop; and a delayed action home position latch including a first latch member on the bottom stop member and a second latch member for engaging the first latch member only after the plunger unit has moved downward through its home position to thereafter releasably connect the bottom stop member to the plunger unit to move therewith and upon an upward return of the plunger unit toward the upper stop to engage the home position stop to releasably lock the plunger unit in its home position without any downward force being exerted by the pipette user on the plunger unit.

2. The manual pipette of claim 1 further including a pipette user actuated trigger mechanism for releasing the home position latch.

3. The manual pipette of claim 1 wherein the second latch member is on the plunger unit.

4. The manual pipette of claim 3 further comprising a pipette user actuated trigger mechanism carried by the pipette body for exerting an upward force on the plunger unit to move the second latch member away from the first latch member to release the home position latch.

5. The manual pipette of claim 3 wherein the home position latch is a magnetic latch comprising:

a magnet on one of the bottom stop member and the plunger unit; and a ferromagnetic pull piece on the other of the bottom stop member and the plunger unit.

6. The manual pipette of claim 3 wherein the home position latch further includes a spacing member for normally separating the first and second latch members as the plunger unit moves downward from the upper stop position past its home position and for releasing after the plunger unit has past its home position to allow the first and second latch member to engage in response to a latch engaging force and releasably lock the bottom stop member to the plunger unit for upward movement therewith until the bottom stop member engages the home position stop to hold the plunger unit in its home position against the upward force of the return string.

7. The manual pipette of claim 5 wherein the magnetic latch further comprises a spacing member including a spacing spring for compressing as the bottom stop member contacts the lower stop and the pipette user applies a downward force to the plunger unit to move the plunger unit toward the bottom stop member to allow the magnet to lock to the pull piece and thereby releasably engage the home position latch.

8. The manual pipette of claim 6 wherein the home position latch is a mechanical latch comprising:

the first latch member comprising a first locking member on the plunger unit;

the second latch member comprising a second locking member on the bottom stop member; and the spacing member comprising a deformable member for deforming as the bottom stop member contacts the lower stop and the pipette user applies a downward force to the plunger unit to move the plunger unit toward the bottom stop member to allow the first and second locking members to lock and releasably engage the home position latch.

9. The manual pipette of claim 8 wherein the deformable member comprises a laterally flexible finger extending axially from the bottom stop member to engage the first locking member on the plunger unit.

10. The manual pipette of claim 9 wherein the flexible finger and the first locking member carry complementary cam surfaces for engaging and laterally deflecting the finger to allow the first and second locking members to lock together.

11. The pipette of claim 3 wherein:

the second latch member is moveable axially with the plunger unit to engage the bottom stop member when the plunger unit reaches its home position and comprises one of a ferromagnetic pull piece or a magnet;

the first latch member comprises a second of the pull piece or the magnet supported for axial movement relative to the plunger unit and the bottom stop member to engage and releaseably lock to the one of the pull piece or the magnet after the plunger unit has moved downward past its home position; and the pipette further comprises a second spring for urging the bottom stop member upward against the home position stop.

12. The pipette of claim 11 further comprising a holder axially moveable within the pipette body relative to the plunger unit and the bottom stop member, the holder supporting the second of the pull piece or the magnet.

13. The pipette of claim 12 further comprising a second lower stop for engaging the holder to limit downward movement of the holder.

14. The pipette of claim 13 wherein the home position latch further comprises a spacing member for normally separating the first and second latch members as the plunger unit moves downward from the upper stop position past its home position.

15. The pipette of claim 14 wherein the spacing member includes a spacing spring for compressing as the holder contacts the second lower stop and the pipette user applies a downward force to the plunger unit to move the plunger unit to the lower stop to allow the magnet to releaseably lock to the pull piece and thereby releaseably engage the home position latch.

16. A manual pipette for repeatable aspirating and dispensing a predetermined quantity of liquid, comprising:

- a hollow hand holdable pipette body containing an upper stop, a lower stop and a home position stop;
- a plunger unit mounted within the pipette body for manual movement by a pipette user downward from the upper stop, past the home position stop to the lower stop, the upper, lower and home position stops defining upper, lower and home stop positions for the plunger unit, the home position being a predetermined starting position for the plunger unit for repeatable aspiration of the predetermined quantity of liquid into a tip extending from the pipette body when the tip is immersed in the liquid;
- a return spring within the pipette body for generating an upward force opposing downward movement of the plunger unit away from the upper stop and for returning the plunger unit to the upper stop position upon a release of the plunger unit;
- a bottom stop member moveable relative to the plunger unit within the pipette body between the lower stop and the home position stop;
- a delayed action home position latch including a first latch member on the plunger unit and a second latch member supported for axial movement relative to the plunger unit and the bottom stop member to engage and releasably lock to the second latch member after the plunger unit has moved downward past its home position to thereafter releasably connect the bottom stop member to the plunger unit to move therewith and upon an upward return of the plunger unit toward the upper stop to engage the home position stop to releasably lock the plunger unit in its home position without any downward force being exerted by the pipette user on the plunger unit; and the pipette further comprises

- a second spring for urging the bottom stop member upward against the home position stop,
- a contact member moveable with the plunger unit to engage the bottom stop member when the plunger unit reaches its home position to drive the bottom stop member downward with movement of the plunger unit from its home position to the lower stop, and
- a second lower stop for limiting downward movement of the second latch member relative to the bottom stop member.

17. The pipette of claim 16 wherein:

the first latch member comprises one of a nub or a latch piece on the plunger unit; and the second latch member comprises a second of the nub or the latch piece including an axially extending laterally flexible finger for engaging and releaseably locking to the nub.

18. The pipette of claim 16 wherein:

the first latch member comprises one of a ferromagnetic pull piece or a magnet; and the second latch member comprises a second of the pull piece or the magnet.

* * * * *